UNITED STATES PATENT OFFICE.

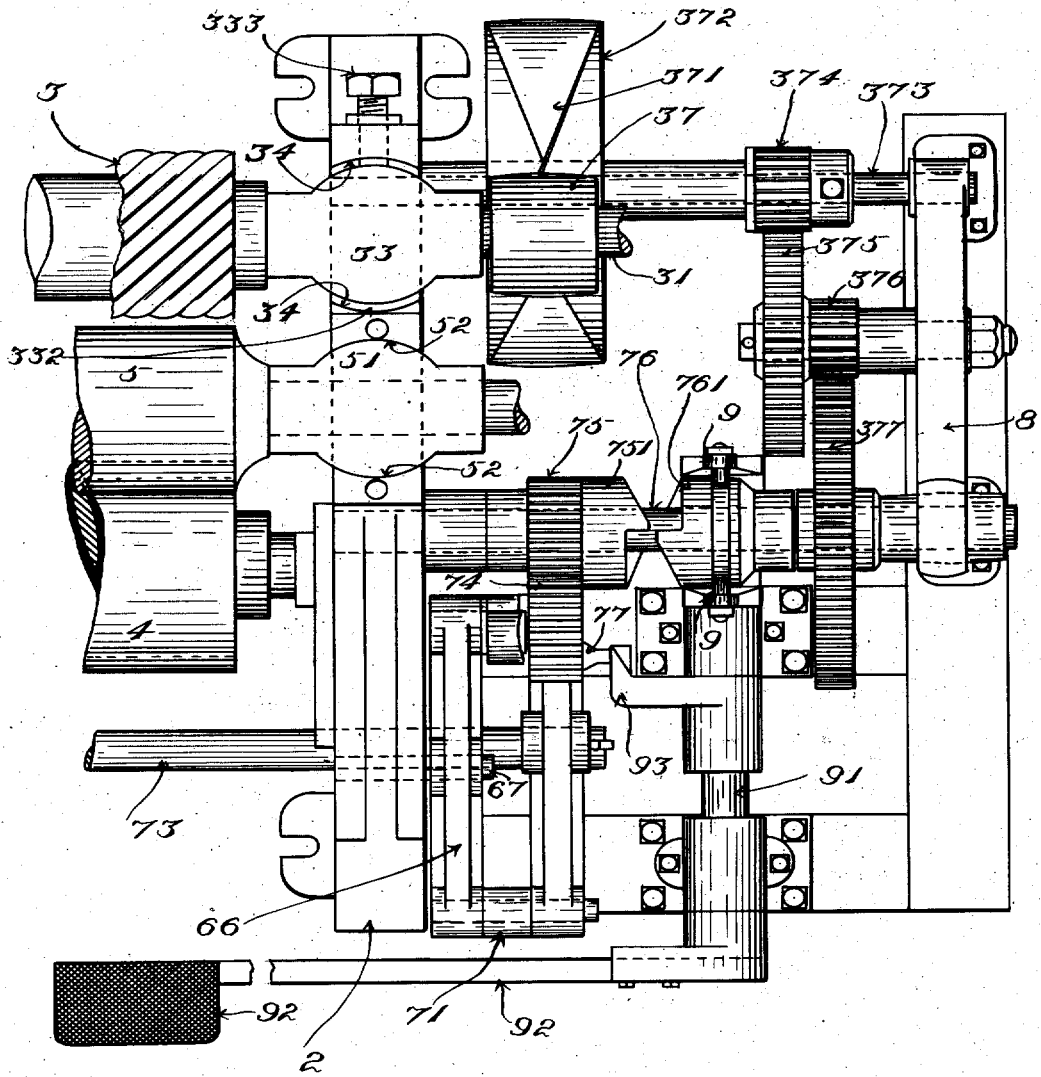

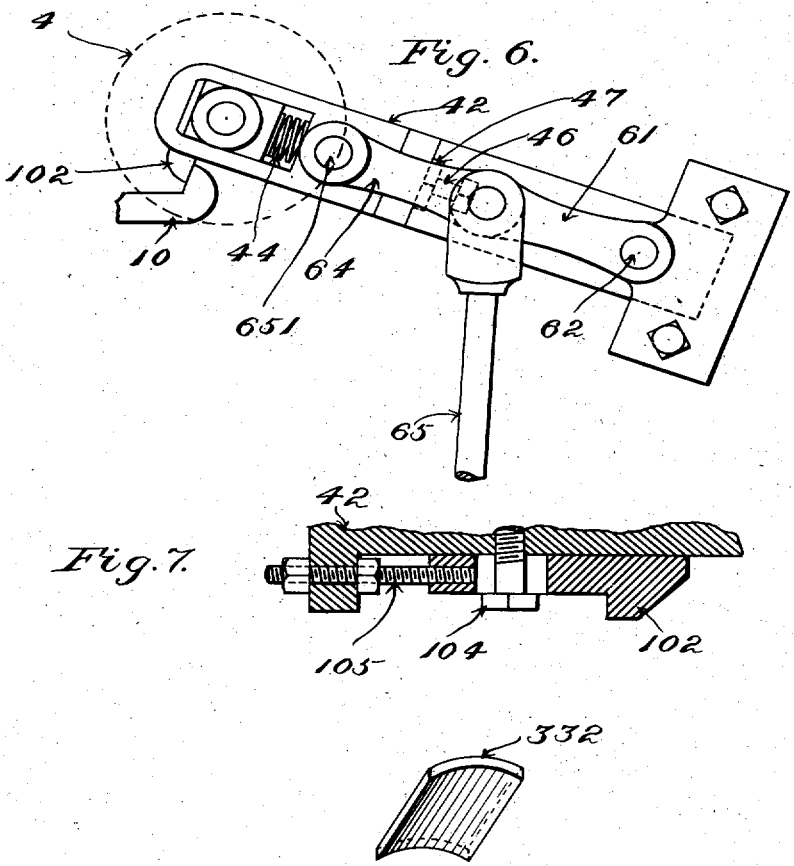

DANIEL P. O'BRIEN, OF WOBURN, MASSACHUSETTS.

MACHINE FOR TREATING HIDES OR SKINS.

No. 904,079.    Specification of Letters Patent.    Patented Nov. 17, 1908.

Application filed October 6, 1903. Serial No. 175,930.

*To all whom it may concern:*

Be it known that I, DANIEL P. O'BRIEN, a citizen of the United States, residing at Woburn, in the county of Middlesex, State of Massachusetts, have invented a certain new and useful Improvement in Machines for Treating Hides or Skins, of which the following is a specification, reference being had therein to the accompanying drawings.

My improvements in machines for treating hides or skins are applicable to machines for performing fleshing, unhairing, or a variety of other operations upon hides or skins. I have herein represented the same as embodied in a machine which is intended more especially for use in fleshing and unhairing hides, but the invention is not restricted to use in machines for performing these particular operations.

Figure 1:
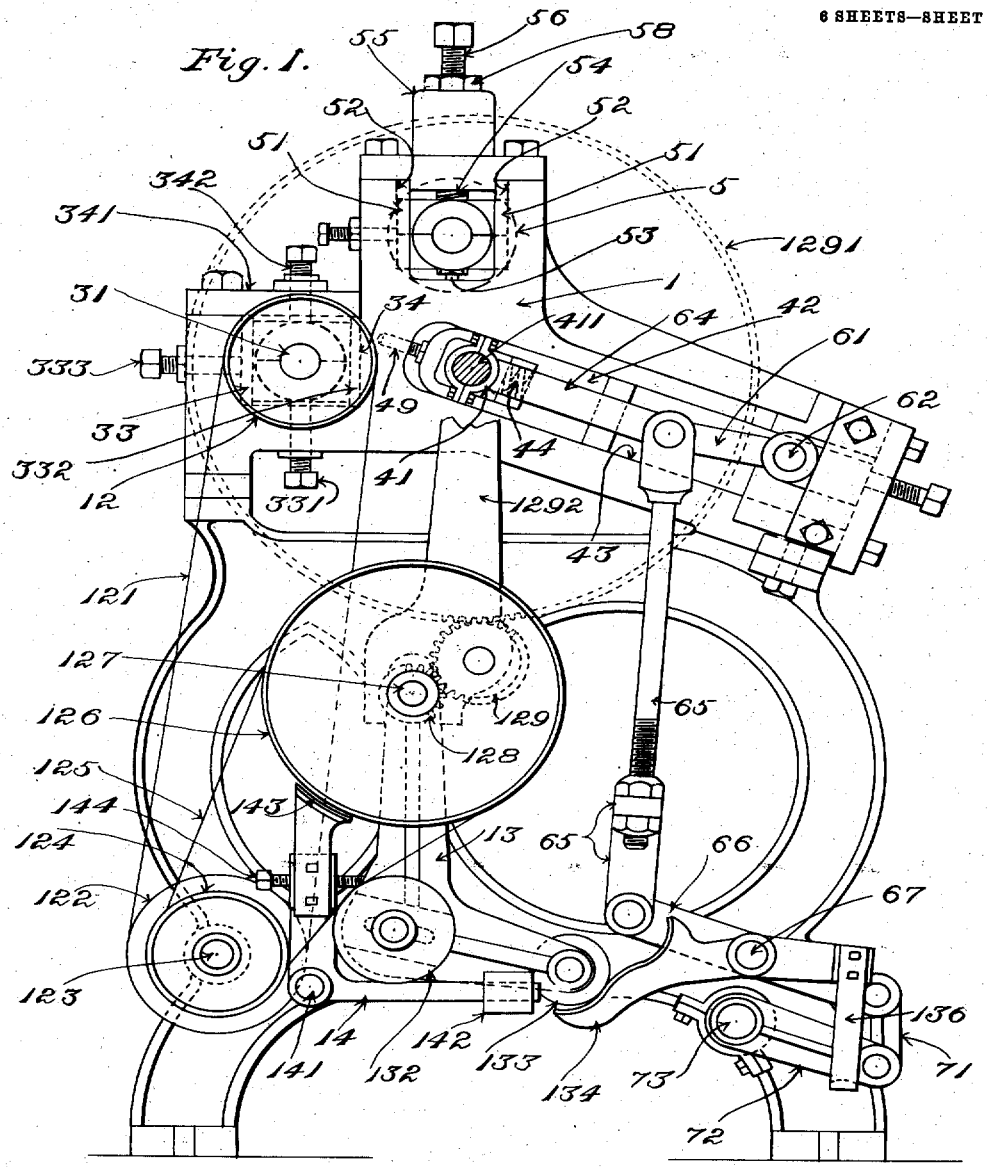
Figure 2:
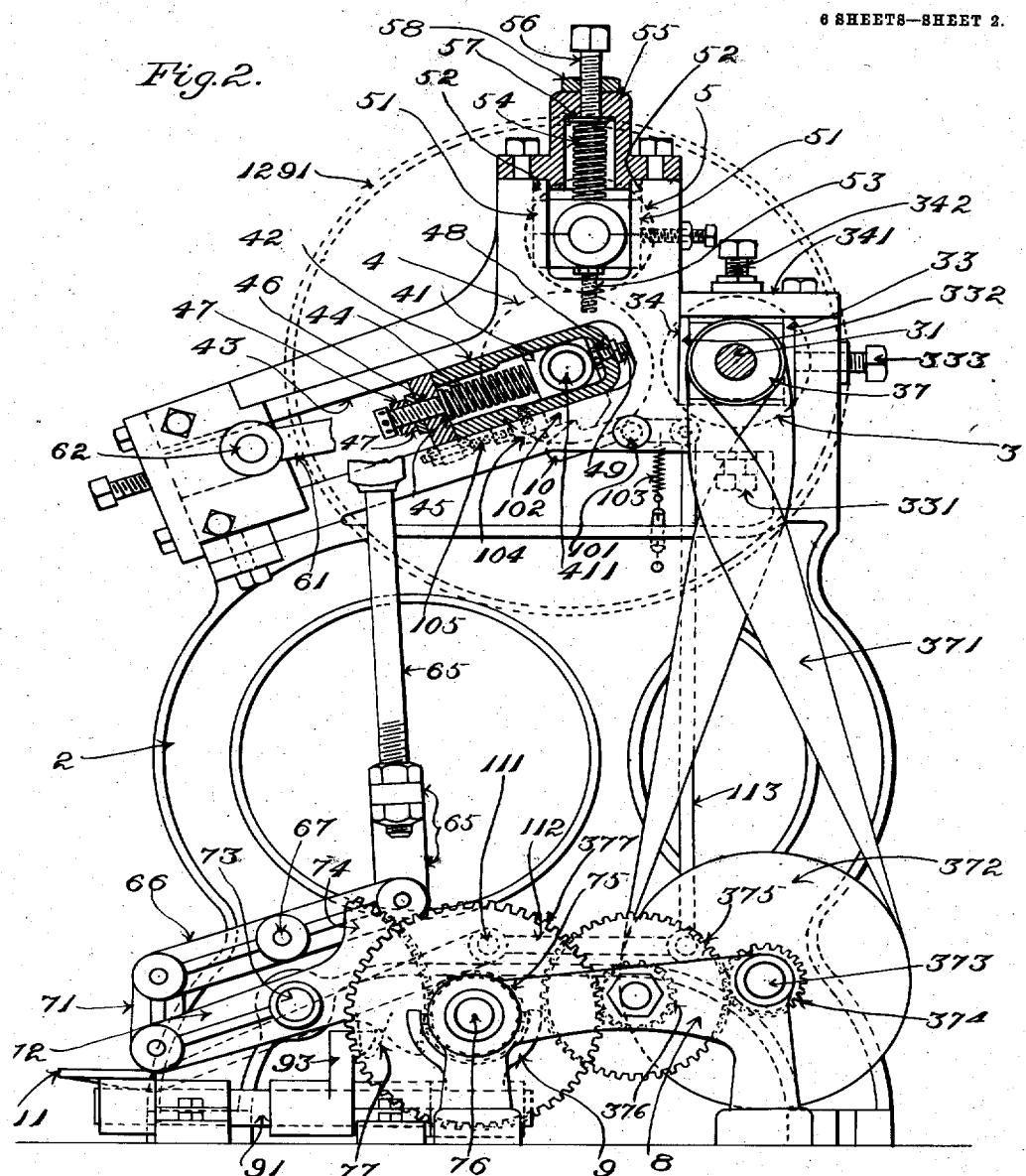
Figure 3:
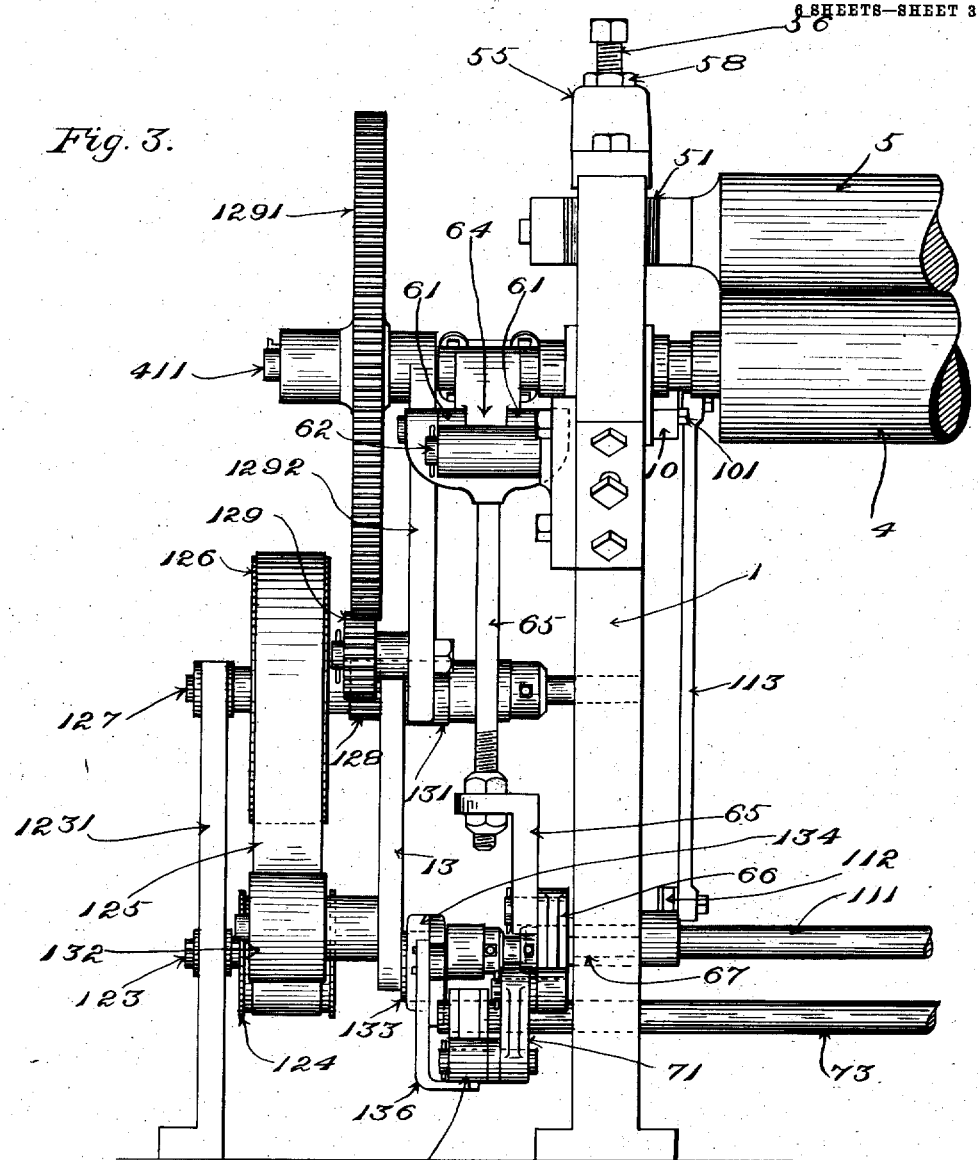
Figure 4:
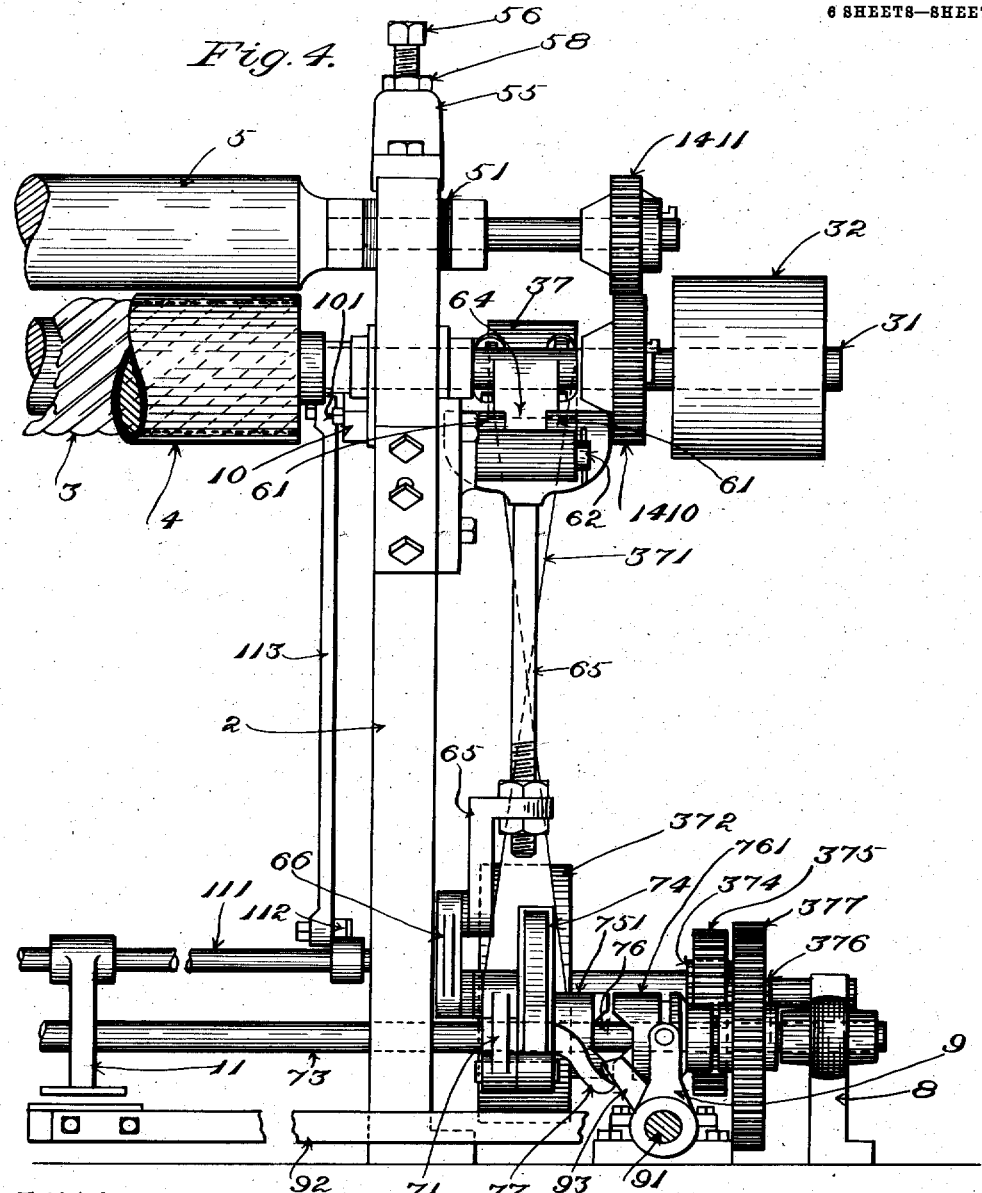

In the drawings, Figure 1 is an end elevation (with shaft 411 in section and certain minor parts omitted) showing one end of a machine containing the improvements in one form of embodiment thereof. Fig. 2 is a view showing in elevation, partly in vertical section, the opposite end of the machine from that which is shown in Fig. 1. Fig. 3 shows in front elevation the end of the machine which is represented in Fig. 1. Fig. 4 shows in front elevation the end of the machine which is represented in Fig. 2. Fig. 5 shows a partial plan of the end of the machine which is represented in Figs. 2 and 4, the toggles at such end, and also the caps of the bearings for the operating or work-roll and feed-roll being omitted. Fig. 6 is a view in end elevation showing a modification. Fig. 7 is a detail view showing in vertical section a portion of one of the slides or carriers for the boxes of the bed-roll, the stop which is carried by the said slide or carrier, and one means of adjusting the said stop. Fig. 8 shows in perspective one of the spacing pieces which are employed in connection with the bearings for the work or operating roll.

Having reference to the drawings,—the opposite end-frames of the machine are designated 1, 2, respectively. These end-frames serve as the principal supports for the main working parts of the machine. In the present instance they sustain the bearings for the different rolls and cylinders which are employed in the machine to operate in connection with the hide or skin to be treated. The number and character or construction of the said rolls or cylinders, as well as the arrangement thereof, may vary in practice according to the nature of the operation which it is desired to perform upon the hide or skin, or according to the views of builders and users of the machine. In the illustrated machine, there are provided an operating or work-roll 3 having a periphery of a character suitable for the performance of the operation aforesaid, a bed-roll 4 serving as a movable support for the hide or skin to be treated, and by means of which the said hide or skin is presented to the action of the said operating or work-roll and backed up while being acted upon, and a feed-roll 5 between which and the bed-roll 4 the hide or skin is compressed and thereby clamped so as to hold the same securely while being acted upon by the operating or work-roll. The said machine is intended, more especially, for fleshing or unhairing hides or skins, and consequently the periphery of the operating or work-roll is furnished with spirally arranged knives or blades, as usual in practice. The bed-roll is covered with a cushion of rubber. By the rotation of the feed-roll 5 in unison with the bed-roll 4 the hide or skin is fed relative to the operating or work-roll 3 so as to cause all portions thereof to be presented to the action of the operating or work-roll.

In order to provide for the convenient introduction of the hide or skin which is to be treated into position to be operated upon, and in some cases for other purposes as well, the rolls of machines of the class to which the invention relates frequently are made capable of movement bodily relative to one another so as to enable them to be separated, as for the convenient application of the hide or skin, and then closed together, as for the purpose of causing the hide or skin to be acted upon. The particular roll or rolls to which relative movement is communicated for the purpose of effecting the separation and re-approach of the rolls varies in different known machines. I have shown the invention embodied in a machine in which the bed-roll is mounted with capacity to be moved toward and from the operating or work-roll and feed-roll.

The shaft 31 of the operating or work-roll is provided with a band-pulley 32 shown only in Fig. 4 for the reception of a driving-band (not shown) by means of which power may be transmitted to the said roll for the purpose of rotating the same. The said shaft is journaled in bearings 33, 33, that are fitted to vertical guideways 34, 34, in the end-frames 1 and 2, the said bearings resting upon the upper ends of vertical adjusting screws 331, 331, which latter serve to enable the bearings and operating or work-roll to be adjusted vertically. Caps 341, 341, employed in connection with the said guideways have applied thereto vertical screws 342, 342, engaging by their lower ends with the tops of the bearings 33, 33, to hold the bearings closed upon the shaft 31 and prevent the said bearings from rising. The front and rear sides of the said bearings are curved or rounded horizontally in the direction of the length of the bearings, as shown best in Fig. 5, the opposite portions or sides of the guideways 34, 34, being correspondingly curved or concaved to fit the said portions of the bearings. The construction and arrangement of the bearings is such as to permit the latter to assume positions in which they aline themselves properly with the shaft 31 in all positions of the latter.

As I have stated above, the invention is shown embodied herein in a machine in which the bed-roll 4 is made movable away from and toward the operating or work-roll and feed-roll. The approach of the bed-roll toward the operating or work-roll is limited by adjustable stops to which reference is made hereinafter. These stops are adjusted from time to time, as circumstances may require. For instance, the reduction in the diameter of the operating or work-roll which is due to grinding the blades or knives of the same for the purpose of sharpening them necessitates an adjustment of the stops, in order that the bed-roll may be caused to approach to the required extent toward the operating or work - roll. After the blades or knives of the latter roll have been ground a number of times, the said roll becomes so much reduced in diameter that adjustment of the bed-roll shifting mechanism would be necessary, in order to produce the considerably increased extent of movement of the bed-roll which would be required in order to carry it into proper relations with the operating or work-roll, if provision were not made for rendering unnecessary this adjustment of the said shifting mechanism. I prefer to obviate this necessity for adjustment of the said shifting mechanism, or at least any considerable adjustment thereof, by making provision for adjusting the operating or work-roll in a direction toward the bell-roll. Thus, I employ in conection with each bearing 33 a spacing-block or change-block, 332, which is curved to fit the curved exterior of the bearing at either the front or the rear side of the latter, and also adapted to be fitted between the bearing and the guideway at either side of the bearing. These spacing-blocks or change-blocks are placed at the outset at the front of the bearings, between the latter and the front walls of the guideways 34, 34. Adjusting screws 333, 333, applied to the end-frames at the rear of the bearings are turned up so as to engage with the bearings and hold them pressed forward against the spacing-blocks or change-blocks. When the diameter of the operating or work-roll has been reduced by grinding, or otherwise, sufficiently to necessitate the change, the spacing-blocks or change-blocks are removed from their original positions at the front of the bearings and inserted at the rear thereof, between the bearings and the adjusting screws 333. The said adjusting screws are then turned up so as thereby to act against the blocks 332, 332, and set the bearings forward until they touch the front walls of the guideways. In this way the operating or work-roll is moved forward bodily a distance corresponding with the thickness of the spacing or change-blocks.

The feed-roll 5 is journaled in self-alining bearings 51, 51, occupying vertical guides or ways 52, 52, in the end-frames. The descent of the bearings in the said guides or ways is limited by adjustable stops constituted by screws 53, 53, upon the heads of which latter the bearings normally rest. Springs 54, 54, are interposed between the tops of the bearings 51, 51, for the said roll and the caps 55, 55, for the guides or ways 52, 52. The tension of each of the said springs is adjusted by means of a screw 56 working in a threaded hole that is tapped in the upper part of the corresponding cap, and acting by its lower end against a plate or washer 57 Fig. 2 which rests upon the upper end of the spring, the adjusting screw 56 being furnished with a lock-nut 58.

The mode of mounting the bed-roll 4, and of providing for the movement of the same toward and from the other rolls, may in some instances vary in practice. In conformity with one feature of the invention, I prefer to employ, in connection with the boxes or bearings 41, 41, for the shaft 411 of the bed-roll, slides 42, 42, which are movable in guides or ways 43, 43, with which the end-frames 1 and 2 are formed or provided. The slides 42, 42, and boxes or bearings 41, 41, are adapted to move back and forth within the guides or ways 43, 43, together, and preferably, although not necessarily in the case of all embodiments of the invention, the slides constitute carriers for the boxes or bearings, within or upon which, however, the boxes or bearings are capable of a certain amount of independent sliding movement in a direction toward and away from the operating or work-roll and feed-roll. The tension of spiral springs 44, 44, which are compressed between the boxes or bearings 41, 41, for the bed-roll and abutments at the forward ends of the slides, constituted in the present instance by plates or washers 45, Fig. 2, which are backed up by adjusting screws 46 provided with lock-nuts 47, operates with a tendency to hold the said boxes or bearings 41, 41, and stops 48 at the rear ends of the said slides in contact with each other.

The stops by which the movement of the bed-roll 4 toward the operating or work-roll 3 is limited are constituted by screws 49, 49, Figs. 1 and 2, set in holes that are tapped in the end-frames at the rear ends of the guides or ways 52, 52, the slides making contact with the projecting heads of the said screws.

In machines on the order of that which is illustrated in the drawings it has been customary heretofore to effectuate the movement of the bed-roll toward and into contact with the operating or work-roll, or with the operating or work-roll and feed-roll, as the case may be, by means of a treadle and connections from the same to the bed-roll. The character and arrangement of the connections has varied more or less. Toggles have in some instances been employed. I employ toggles through preference, on account of the great gain in power which is incident to the use thereof, and have shown the same in the drawings at each end of the machine. In the illustrated construction and arrangement the lower or outer link 61 of each pair of toggles is pivotally mounted upon a stud 62 that is carried by the corresponding end-frame at the forward end of the guide or way 43 with which such end-frame is formed or provided. The upper or inner link 64 of each pair of toggles is pivotally connected, either directly or indirectly, with the corresponding end of the bed-roll. In Figs. 1 to 4 the said upper or inner link 64 is hung upon the corresponding end of the shaft 411 of the bed-roll 4, so that the movement which is transmitted through the toggles is communicated directly to the bed-roll, and hence the toggles act positively in connection with the bed-roll in moving the latter toward the operating or work-roll and feed-roll.

In Fig. 6 the link 64 is connected with a stud 651 carried by the slide or carrier 42, so that the said movement is communicated to the bed-roll through the medium of the said slide or carrier. In the latter instance, the movement which is communicated through the toggles to the slide or carrier in a direction tending to carry the bed-roll toward the operating or work-roll and feed-roll is transmitted through the intermediary of the spring 44, which is compressed between the said slide or carrier and the box or bearing of the bed-roll. Thus, in this arrangement the bed-roll is carried with yielding force toward the operating or work-roll and feed-roll. The yielding of the spring 44 enables the bed-roll to accommodate itself to undue thickness of the hide or skin intervening between the bed-roll and the operating or work-roll and feed-roll, and to irregularities in the thickness of the hide or skin as the same may pass between the bed-roll and the other rolls while the hide or skin is being fed along, although the elastic covering of the bed-roll also yields more or less, and thus acts to compensate for the said thickness or irregularities. In the case of the construction and arrangement shown in Figs. 1 to 4, in which the bed-roll is moved with positive force into its working position, undue thickness or irregularities in the thickness of the hide or skin is compensated for by the yielding of the elastic covering. The operating rods 65, 65, for the respective pairs of toggles extend downward from the latter and are connected in the lower part of the machine with the toggle-actuating instrumentalities. The exertion which is required to be made by the workman in operating the bed-roll to move the same toward and into working relations with the operating or work-roll and the feed-roll, and in maintaining the said bed-roll in working relations with the other rolls while the hide or skin is being operated upon, is usually quite considerable, and is greatly increased in machines in which the hide or skin to be treated retains its full original width. Usually only a heavy man is suitable to operate the machine. In order to relieve the workman of the exertion which is incident to moving the bed-roll into the said working relations, and maintaining it there, I provide power-driven actuating connections under the control of the workman, by means of which the bed-roll may be moved automatically into its working position, and locking devices, to hold the bed-roll in its working position, until the return of the latter to its inoperative position, apart from the operating or work-roll and feed-roll, is desired. The power-driven actuating connections for the bed-roll, and also the locking devices, may vary in construction and arrangement in some instances. I will describe the forms thereof which are contained in the present embodiment of the invention and illustrated in the accompanying drawings. It will be understood that I do not limit myself in all respects to the particular form, etc., of the devices herein shown. In the drawings, the rods 65, 65, extending down from the toggles are connected with the rearward arms of levers 66, 66, which are pivoted upon studs 67, 67, the latter being carried by the end-frames 1, 2. For the purpose of enabling the said levers to be actuated by power, the forwardly projecting arms thereof are connected by links 71, 71, with arms 72, 72, extending forwardly from a rock-shaft 73 which is journaled in bearings in the said end-frames.

This rockshaft 73 at one end has fast therewith a gear-segment 74 meshing with a pinion 75 loose upon a short shaft 76 which is journaled in bearings in the corresponding end-frame 2 and in a stand 8 outside the said end-frame. For convenience, in the present instance the gear-segment is formed upon a continuation of one of the arms 72. The short shaft 76 is continuously driven from the operating or work-roll 3 through the instrumentality of a band-pulley 37 upon the latter, a crossed driving-band 371 passing from the said pulley to a larger pulley 372 which is fast upon a short shaft 373 journaled in the end-frame 2 and the small stand 8, a pinion 374 fast upon the said short shaft 373, and intermediate speed-reducing gearing 375, 376, 377, the gear-wheel 377 being fast upon the shaft 76 upon which the pinion 75 is loosely mounted. In order to enable the said pinion 75 to be operatively connected with the shaft 76 when required, for the purpose of causing power to be transmitted through the intermediate connections to the toggles, so as to move the bed-roll into working relations with the other rolls, and also to enable the said pinion to be disconnected from the said shaft, so as to discontinue the application of power to the said toggles, the pinion 75 is formed or provided with one member or half 751 of a clutch, the other member or half 761 being mounted upon the shaft 76 and splined thereto, and in connection with the latter clutch-member a manually-controlled shipper device is employed, comprising a fork 9 engaging with the said clutch-member 761, a rockshaft 91 on which the said fork 9 is mounted, and a treadle 92 extending from the said rockshaft 91 in a direction toward the middle of the length of the machine at the front of the latter. Pressure applied by means of the foot of the workman upon the said treadle 92 will depress the latter so as to rock the rockshaft 91, and through the medium of the shipper-fork 9 the clutch-member 761 will be moved longitudinally upon the shaft 76 into engagement with the opposing clutch-member 751, whereby the pinion 75 will be coupled to the shaft 76 so as to turn in unison therewith, and power will be transmitted to the toggles to operate the same and thereby move the bed-roll into working relations with the operating or work-roll and feed-roll.

In order to cause the opening of the clutch and thereby discontinue the transmission of power to the toggles as soon as the bed-roll has been moved inward to the required extent, the rockshaft 73 is provided with a cam-projection 77, herein attached to the segment 74, and which, as the rockshaft 73 approaches the end of the required extent of movement, encounters an arm 93 projecting from the shipper rockshaft 91, and by pressing the said arm outwardly causes the rockshaft 91 to be turned so as to open the clutch automatically.

The locking devices by means of which the bed-roll is held in working relations with the other rolls comprise, essentially, hooks or latches 10, 10 which are pivoted at 101, 101 to the end-frames 1 and 2. These hooks or latches 10, 10 coöperate with projections 102, 102, which are carried by the slides 42, 42. A contracting spiral spring or springs 103 acts in connection with the hooks or latches so as to press the hooks or latches upward, and thereby as the slides or carriers 42, 42, are carried inward by the movement which places the bed-roll in working position the said hooks or latches engage with the said projections 102, 102, on the slides or carriers. Thereby the bed-roll is retained in its working position after the clutch pertaining to the power-actuated moving connections for the said roll has been opened or disconnected. For the purpose of enabling the locking devices to be operated so as to effect a release of the bed-roll when it is desired to permit the same to move to its inoperative position at the front of the machine, manually-controlled operating means for the said locking devices are provided. In the present instance, the said operating means comprise a treadle 11 which is fast upon a rockshaft 111 journaled in the end-frames 1, 2, the said rockshaft having rearwardly extending arms 112, Fig. 2, which are connected by connecting rods 113 with the hooks or latches. By pressing upon the said treadle the workman causes the hooks or latches to be disengaged from the projections 102, 102, of the slides or carriers. In order that when released by the disengagement of the locks or latches the bed-roll may gravitate away from the work or operating-roll and feed-roll, the guides or ways 43, 43, are arranged to incline downwardly and forwardly, so that the slides or carriers 42, 42, may move forward along the same under the influence of gravity.

When the stop-screws 49, 49, by which the extent of the rearward movement of the slides or carriers 42, 42, is determined are adjusted, a corresponding adjustment of projections 102, 102, upon the slides or carriers is made, in order that the hooks or latches may engage properly with the said projections, and without permitting any reverse movement of the slides or carriers. In order to provide for the adjustment of the said projections upon the slides or carriers, each projection is secured to the corresponding slide or carrier by means of a bolt 104 passing through a longitudinal slot in the body of the projection into the slide or carrier, and an adjusting screw 105 is provided by means of which the projection may be moved lengthwise upon the slide or carrier. See Fig. 7.

Suitable driving connections for the bed-roll are provided. In the present instance, the said connections comprise a band-pulley 12 upon one end of the shaft of the operating or work-roll, as shown in Fig. 1, a driving-band 121 passing from the said band-pulley 12 to a corresponding pulley 122 on a shaft 123 which is journaled in bearings which are provided in the end-frame 1 and the stand 1231 outside the latter, another band-pulley 124 fast upon the said short shaft 123, a driving-band 125 passing from the latter pulley to and around a larger band-pulley 126 upon the upper shaft 127, which last is journaled in bearings in the end-frame 1 and the said outer stand, a pinion 128 on the latter shaft, a carrier-gear or gears at 129, and a large gear 1291 upon the shaft of the bed-roll. The carrier-gear or gears 129 is or are mounted upon a stud or studs carried by a support or stand 1292 which at its upper end is sleeved upon the shaft 411 of the bed-roll and steadied at its lower end by being forked or slotted to fit over the sleeve or hub 131 which is mounted upon the said shaft 127, and from which depends the belt-tightener. The connection of the support or stand 1292 with the shaft of the bed-roll causes the carrier-gear 129 to continue in proper gear-connection with the large gear 1291 on said shaft in all positions of the bed-roll. The slotted or sliding fit of the said support or stand in connection with the hub is made necessary by the fact that the path of movement of the bed-roll is not concentric with the shaft 127.

The belt 125 connecting the two pulleys 124, 126, is a slack or loose band and normally does not serve to transmit movement of the latter pulley so as to drive the bed-roll. In order to tighten the said driving-band at the required time so as to render it operative to transmit movement of rotation to the bed-roll, I provide the belt-tightener 13, which is furnished with a sleeve or hub 131 by means of which it is mounted upon the shaft 127, and with a tightener-pulley 132 that is adapted to bear against one side of the said slack driving-band. The belt-tightener arm is furnished with a roll 133 for engagement with the cam-face of a lever 134 which is pivoted upon the stud 67 extending outward from the end-frame 1, the said lever 134 having its forward arm provided with a downwardly extending hook 136 which at its free extremity projects underneath the arm 72 at the proximate end of the rock-shaft 73. When the said rockshaft 73 is operated by the power-connections which have already been described, so as to move the same for the purpose of actuating the toggles and thereby causing the bed-roll to be moved into working position, the arm 72 in its descent engages with the hook 136 and acts to turn the lever 134 so as to cause its cam-face, by pressure against the roll 133, to move the said belt-tightener and press the tightener-pulley 132 against the driving-band 125 and thereby tighten the same so as to render it operative to transmit movement of rotation to the bed-roll.

For the purpose of arresting the rotation of the bed-roll when the bed-roll is caused or permitted to be moved outward into its operative position, a brake 14 is provided, see Fig. 1, it comprising a lever which is mounted pivotally at 141 and weighted at 142 so as to cause the brake-shoe 143 to tend to move in a direction to carry the same into contact with the periphery of the band-pulley 126. An adjustable stop constituted by a screw 144 projects from the brake-lever into position to make contact with a portion of the tightener-arm. When the tightener-arm is operated so as to press the tightener-pulley against the driving-band 125, the tightener-arm acts against the said screw to move the brake away from the periphery of the pulley, but when by the outward movement of the bed-roll the connected parts are caused to move correspondingly so as to raise the arms 72, 72, of the rockshaft 73 and permit the cam-lever 134 and tightener-arm to gravitate into their normal and inoperative positions, in which the tightener-pulley is withdrawn and the driving-band is permitted to become slack, the brake-lever is left free to move under the influence of its weight so as to cause its brake-shoe to engage with the periphery of the pulley 126 and thereby arrest the rotation of such pulley and the bed-roll.

For the purpose of causing the feed-roll to turn in unison with the bed-roll, when the bed-roll occupies its working position, the shaft of the bed-roll is furnished with a gear 1410, and a similar gear 1411 is mounted upon the shaft of the feed-roll. When the bed-roll occupies its inoperative position at the front of the machine, these gears are out of mesh with each other, but when the bed-roll is moved back into working position, the two gears come into mesh, and thereby movement is communicated from the bed-roll to the feed-roll.

I lay no claim herein to the combination in a leather working machine with an operating roll, a feed roll, a bed roll, and means for moving the said bed roll toward and from the feed roll and the operating roll, of mechanism operated by the bed roll in the aforesaid movement thereof for starting and stopping the feed roll and bed roll, or to means for starting and stopping the rotation of the bed roll operated by the said bed roll in its movement toward and away from the operating roll, or to a continuously operating device for controlling the rotation of the feed roll and the bed roll, and an actuating device operated by said bed roll in the movement thereof relative to the operating roll to control said operating device whereby the bed roll and feed roll are set in operation when the bed roll is presented to the operating roll, or to means for rotating the feed roll and bed roll, and a device operated by the said bed roll in the aforesaid movement thereof for controlling the aforesaid rotating means.

I claim as my invention:—

1. In an apparatus for treating hides or skins, the combination with an operating roll, and a movable support for the hide or skin to be treated, one of which parts is movable bodily with respect to the other, of toggles connected with the said movable part to move the latter into working relations with the other, cranks in operative connection with said toggles for operating the latter, power-driven actuating connections for said cranks, and a manually-controlled shipper-device whereby the said connections may be made operative to actuate the cranks and thereby operate the toggles when desired, substantially as described.

2. In an apparatus for treating hides or skins, the combination with an operating roll, and a movable support for the hide or skin to be treated, one of which parts is movable bodily with respect to the other, of toggles connected with the said movable part to move the latter into working relations with the other, power-driven actuating connections for said toggles embracing a clutch, and a manually-controlled clutch-shipper whereby the said connections may be made operative to actuate the toggles when desired, substantially as described.

3. In an apparatus for treating hides or skins, the combination with an operating roll, and a movable support for the hide or skin to be treated, one of which parts is movable bodily with relation to the other, of toggles connected with the said movable part to move the latter into working relations with the other part, power-driven actuating connections for said toggles, a manually-controlled shipper-device whereby the said connections may be made operative to actuate the toggles when desired, and a manually-controlled lock to maintain the said working relations of the roll and support, substantially as described.

4. In an apparatus for treating hides or skins, the combination with an operating roll, and a movable support for the hide or skin to be treated, one of which parts is movable bodily with relation to the other, of toggles connected with the said movable part to move the latter into working relations with the other part, power-driven actuating connections for said toggles embracing a clutch, a manually-controlled clutch-shipper whereby the said connections may be made operative to actuate the toggles when desired, and a manually-controlled lock to maintain the said working relations of the roll and support, substantially as described.

5. In an apparatus for treating hides or skins, the combination with the operating roll, the roll serving as a support for the hide or skin to be treated, means to move one of the said rolls bodily into working relations with the other, the slide, the spring between the said slide and the bearing of the bodily movable roll, and the lock engaging said slide to hold the rolls in working relations, substantially as described.

6. In an apparatus for treating hides or skins, the combination with the operating roll, the roll serving as a support for the hide or skin to be treated, power-driven devices to move one of the said rolls bodily into working relations with the other, the slide, the spring between the said slide and the bearing of the bodily movable roll, and the lock engaging the said slide to hold the rolls in working relations, substantially as described.

7. In an apparatus for treating hides or skins, the combination with the operating roll, the roll serving as a support for the hide or skin to be treated, the toggles, actuating connections for the toggles whereby to cause one of the said rolls to be moved bodily into working relations with the other, the slide, the spring between the said slide and the bearing of the bodily movable roll, and the lock engaging the said slide to hold the rolls in working relations.

8. In an apparatus for treating hides or skins, the combination with the operating roll, the roll serving as a support for the hide or skin to be treated, the toggles, power-driven actuating connections for the toggles whereby to cause one of the said rolls to be moved bodily into working relations with the other, the slide, the spring between the said slide and the bearing of the bodily movable roll, the lock engaging the said slide to hold the rolls in working relations, and a manual controlling device whereby said power-driven actuating connections may be rendered operative when desired.

9. In an apparatus for treating hides or skins, the combination with the operating roll, the roll serving as a support for the hide or skin to be treated, driving connections adapted to rotate the said supporting roll, power-driven devices to move one of the said rolls bodily with respect to the other and into working relations with the latter, and also adapted to render such driving connections operative to actuate the supporting roll, and a clutch whereby said power-driven devices may be rendered operative when desired, substantially as described.

10. In an apparatus for treating hides or skins, the combination with the operating roll, the roll serving as a support for the hide or skin to be treated, driving connections adapted to rotate the said supporting roll, toggles whereby to move one of the said rolls bodily with respect to the other roll and into working relations with the latter, power-driven devices to actuate the said toggles and also render the said driving connections operative to actuate the supporting roll, and a clutch whereby said power-driven devices may be rendered operative when desired, substantially as described.

11. In an apparatus for treating hides or skins, the combination with the work-roll having an abrading periphery, and the bed-roll having a yielding periphery by which the hide or skin to be treated is backed up while being acted upon by the periphery of the work-roll, and means for differentially rotating the said rolls, the latter normally occupying a separated position which facilitates the introduction of a hide or skin between them, of means to cause relative bodily movement of the said rolls into working relations with each other, and a manually-controlled lock whereby the rolls are retained in such relations.

12. In an apparatus for treating hides or skins, the combination with the work-roll having an abrading periphery, and the bed-roll having a yielding exterior by which the hide or skin to be treated is backed up while being acted upon by the periphery of the work-roll, and means for differentially rotating the said rolls, the latter normally occupying a separated position which facilitates the introduction of a hide or skin between them, of means to cause relative bodily movement of the said rolls into working relations with each other, a manually-controlled lock whereby the rolls are retained in such relations, and a spring which permits relative yielding bodily of the rolls to accommodate the thickness of the hide or skin.

13. In an apparatus for treating hides or skins, the combination with an operating roll, and a bed-roll, of devices for producing relative bodily approach of the said rolls and locking them in close working relations to enable the operating roll to act upon a hide or skin supported by the bed-roll, power driving-connections for the devices for causing such approach and manually-operable means for shipping said driving-connections into driving relations with the said devices to actuate the latter.

14. In an apparatus for treating hides or skins, the combination with an operating roll, and a bed-roll, of devices for producing relative bodily approach of the said rolls to enable the operating roll to act upon a hide or skin supported by the bed-roll, power driving-connections for the said devices, manually-operable means for shipping said driving-connections into driving relations with the said devices to actuate the latter, and a manually-controlled lock acting to retain the rolls in the relative position thus given to them until released by the disengagement of such lock.

15. In an apparatus for treating hides or skins, the combination with an operating roll, and a bed-roll, of devices for producing movement of one of said rolls into working relations with the other thereof, to enable the operating roll to act upon a hide or skin supported by the bed-roll, power driving-connections for the said devices, manually-operable means for shipping said connections into driving relations with the said devices to actuate the latter, and a lock acting to retain the movably-mounted roll in the said working relations with the other thereof.

16. In an apparatus for treating hides or skins, the combination with an operating roll, and a bed-roll, of devices for producing movement of one of said rolls into working relations with the other thereof to enable the operating roll to act upon a hide or skin supported by the bed-roll, power driving-connections for the said devices, manually-operable means for shipping said connections into driving relations with the said devices to actuate the latter, a lock acting to retain the movably-mounted roll in the said working relations with the other thereof, and a spring to permit one roll to yield relative to the other to accommodate the thickness of the hide or skin.

17. In an apparatus for treating hides or skins, the combination with an operating roll, a roll serving as a support for the hide or skin to be treated, toggles connected with one of the said rolls to move the latter into working relations with the other roll, and power-driven actuating connections for said toggles, of a manually-controlled lock whereby the movably mounted roll is held in the said relations, substantially as described.

18. In an apparatus for treating hides or skins, the combination with an operating roll, a roll serving as a support for the hide or skin to be treated, toggles connected with one of the said rolls to move the latter into working relations with the other roll, and power-driven actuating connections for said toggles, of a manually-controlled lock whereby the movably mounted roll is held in the said relations, and a spring to permit the roll to yield bodily to accommodate the thickness of the hide or skin, substantially as described.

19. In an apparatus for treating hides or skins, the combination with an operating roll, a roll serving as a support for the hide or skin to be treated, means to move one of the said rolls bodily with respect to the other into working relations with the latter, a slide movable in unison with the said bodily movable roll, a spring compressed between the bearings for the said roll and the said slide, and a manually-controlled lock engaging with the said slide to hold the said roll in working relations with the other roll, substantially as described.

20. In an apparatus for treating hides or skins, the combination with an operating roll having an abrading periphery, a roll having a yielding exterior serving as a support for the hide or skin while being acted upon by the said operating roll, means whereby the said rolls will normally stand separated from each other, and means to move one of the said rolls bodily with respect to the other into working relations with the latter, of a carrier for the bearing of the bodily-movable roll, a spring interposed between the said bearing and the said carrier, and a manually-controlled lock engaging with the said carrier to hold the said roll in the said working relations.

21. In an apparatus for treating hides or skins, the combination with an operating roll, a roll serving as a support for the hide or skin to be treated, power-driven devices to move one of the said rolls bodily with respect to the other into working relations with the latter, and a manually-controlled shipper whereby the said devices may be made operative when desired, of a carrier for the bearing of the bodily movable roll, a spring interposed between the said bearing and the said carrier, and a manually-controlled lock engaging with the said carrier to hold the said roll in the said working relations, substantially as described.

22. In an apparatus for treating hides or skins, the combination with an operating roll, a roll serving as a support for the hide or skin to be treated, toggles connected with one of the said rolls, power-driven connections for said toggles to actuate the latter to move the said roll bodily with respect to the other into working relations with the latter, and a manually-controlled shipper whereby the said connections may be made operative to actuate the toggles when desired, of a carrier for the bearing of the bodily movable roll, a spring interposed between the said bearing and the said carrier, and a manually-controlled lock engaging with the said carrier to hold the said roll in the said working relations, substantially as described.

23. In an apparatus for treating hides or skins, the combination with an operating roll, a roll serving as a support for the hide or skin while being acted upon by the operating roll, means whereby one of the said rolls will normally stand separated from the other thereof, to permit of the introduction of a hide or skin between them, a carrier for the said roll, and mechanism engaging with said carrier to close the rolls together, of a manually-controlled lock directly coöperating with the said carrier to hold its roll in working relations with the other roll, substantially as described.

24. In an apparatus for treating hides or skins, the combination with an operating roll, a roll serving as a support for the hide or skin to be treated, a movable carrier for one of the said rolls, toggles connected with the said carrier to move the latter to carry its roll into working relations with the other roll, means to actuate the said toggles, and a manually-controlled lock whereby the said relations are maintained, substantially as described.

25. In an apparatus for treating hides or skins, the combination with an operating roll, a roll serving as a support for the hide or skin to be treated, a movable carrier for one of the said rolls, toggles connected with the said carrier to move the same to place its roll in working relations with the other roll, power-driven actuating connections for said toggles, a manually-controlled shipper-device whereby the said connections may be made operative to actuate the toggles when desired, and a manually-controlled lock whereby the said relations are maintained, substantially as described.

26. In an apparatus for treating hides or skins, the combination with an operating roll, a roll serving as a support for the hide or skin to be treated, a movable carrier for one of the said rolls, toggles connected with the said carrier to move the said roll into working relations with the other roll, power-driven actuating connections for said toggles, embracing a clutch, a manually-controlled shipper-device whereby the said connections may be made operative to actuate the toggles when desired, and a manually-controlled lock whereby the said relations are maintained, substantially as described.

27. In an apparatus for treating hides or skins, the combination with an operating roll having a yielding periphery, a roll having a yielding exterior serving as a support for the hide or skin while being acted upon by the operating roll, means whereby the said rolls will normally stand separated from each other, a movable-carrier provided with yielding bearings for one of the said rolls, and means to move the carrier to place its roll in working relations with the other roll, of a manually-controlled lock whereby the said carrier is held in the position given it by the said means.

28. In an apparatus for treating hides or skins, the combination with an operating roll, and a movable support for the hide or skin to be treated, of the toggles for moving one of such parts bodily with respect to the other and into working relations with the latter, the shaft operatively connected with said toggles for actuating the latter, power-driven actuating connections for the said shaft, a manually-controlled shipper for said actuating connections, driving connections for rotating the said movable support, and devices in connection with the said shaft whereby the action of the said driving connections is controlled.

29. In an apparatus for treating hides or skins, the combination with an operating roll, and a movable support for the hide or skin to be treated, one of which parts is movable bodily with relation to the other and normally gravitates into a position separated therefrom, of toggles connected with the said movable part to move the latter into working relations with the other, a shaft in operative connection with the said toggles to actuate the same, a toothed segment connected with the said shaft, a gear engaging with the said segment, driving connections for said gear, and a shipper whereby the driving of said gear is controlled.

30. In an apparatus for treating hides or skins, the combination with an operating roll, and a movable support for the hide or skin to be treated, one of which parts is movable bodily with relation to the other and normally gravitates into a position separated therefrom, of toggles connected with the said movable part to move the latter into working relations with the other, a shaft in operative connection with the said toggles to actuate the same, a toothed segment connected with the said shaft, a gear engaging with the said segment, driving connections for said gear, a shipper whereby the driving of said gear is controlled, and a lock whereby the bodily-movable part may be held in working position after being moved into the latter by the action of the toggles.

31. In an apparatus for treating hides or skins, the combination with an operating roll, a movable support for the hide or skin to be treated, one of which parts is movable bodily with relation to the other and normally gravitates into a position separated therefrom, and driving connections for rotating the said movable support, of toggles connected with the said movable part to move the latter into working relations with the other, a shaft in operative connection with the said toggles to actuate the latter, devices under operative control of said shaft whereby the action of the said driving-connections is controlled, a toothed segment connected with the said shaft, a gear engaging with the said segment, driving-connections for said gear, and a shipper whereby the driving of said gear is controlled.

32. In an apparatus for treating hides or skins, in combination, an operating roll, a support for the hide or skin to be treated, one of which parts is movable bodily with relation to the other, means for occasioning the said bodily movement, driving-connections for rotating the said support embracing a slack driving-band and band-pulleys around which the same passes, the belt-tightener to act in connection with the said driving-band, and the movable cam-piece operatively connected with the said means and whereby the belt-tightener is caused to act.

33. In an apparatus for treating hides or skins, in combination, an operating roll, a support for the hide or skin to be treated, one of which parts is movable bodily with relation to the other, toggles connected with said movable part, an operating shaft connected with said toggles whereby to actuate the latter to occasion the bodily movement, driving-connections for rotating the said support embracing a slack driving-band and band-pulleys around which the same passes, the belt-tightener to act in connection with the said driving-band, and the movable cam-piece operatively connected with the said shaft and whereby the belt-tightener is caused to act.

34. In an apparatus for treating hides or skins, in combination, an operating roll, a support for the hide or skin to be treated, one of which parts is movable bodily with relation to the other, means for occasioning the said bodily movement, connections for rotating the said support embracing a slack driving-band and band-pulleys around which the same passes, the belt-tightener to act in connection with the said driving-band, the movable cam-piece operatively connected with the said means and whereby the belt-tightener is caused to act, and the brake in operative connection with the said belt-tightener.

35. In an apparatus for treating hides or skins, in combination, an operating roll, a support for the hide or skin to be treated, one of which parts is movable bodily with relation to the other, toggles connected with said movable part, an operating shaft connected with said toggles whereby to actuate driving-connections for rotating the said the latter to occasion the bodily movement, support embracing a slack driving-band and band-pulleys around which the same passes, the belt-tightener to act in connection with the said driving-band, the movable cam-piece operatively connected with the said shaft and whereby the belt-tightener is caused to act, and the brake in operative connection with the said belt-tightener.

36. In an apparatus for treating hides or skins, the combination with the operating roll, a bed-roll, and a movable carrier for one of such rolls, of automatic means for operating said carrier to move the said roll into working relations with the other roll, a manual controlling device for such means, and driving devices for the bed-roll including a slack driving-band and means to tighten the said driving-band upon its pulleys when the rolls are in the said working relations.

37. In an apparatus for treating hides or skins, the combination with an operating roll, and a bed-roll, of devices for producing relative bodily approach of the said rolls and locking them in close working relations to enable the operating roll to act upon a hide or skin when supported by the bed-roll, power driving-connections for the devices for causing such approach, manually-operable means for shipping the said connections into driving relations with the said devices to actuate the latter, and driving devices acting to drive the bed-roll when the two rolls occupy working relations with respect to each other and to discontinue the driving thereof when the said relations are terminated.

38. In an apparatus for treating hides or skins, the combination with an operating roll, a roll serving as a support for the hide or skin while being acted upon by the operating roll, devices to close the said rolls together upon a hide or skin introduced between them, power-connections for the said devices, manually-controlled means for rendering said power-connections operative to actuate the said devices, and locking devices operating to retain the said rolls in closed relation.

39. In an apparatus for treating hides or skins, the combination with an operating roll, a roll serving as a support for the hide or skin while being acted upon by the operating roll, devices to close the said rolls together upon a hide or skin introduced between them, power-connections for the said devices, a manually-controlled clutch for rendering said power-connections operative to actuate the said devices, and means to terminate the closing action when the rolls come together.

40. In an apparatus for treating hides or skins, the combination with an operating roll, a roll serving as a support for the hide or skin while being acted upon by the operating roll, devices to close the said rolls together upon a hide or skin introduced between them, power-connections for the said devices, manually-controlled means for rendering said power-connections operative to actuate the said devices, and means acting automatically to unship the said power-connections on completion of the closing movement.

In testimony whereof I affix my signature in presence of two witnesses.

DANIEL P. O'BRIEN.

Witnesses:
CHAS. F. RANDALL,
EDITH J. ANDERSON.

---

Corrections in Letters Patent No. 904,079.

It is hereby certified that in Letters Patent No. 904,079, granted November 17, 1908, upon the application of Daniel P. O'Brien, of Woburn, Massachusetts, for an improvement in "Machines for Treating Hides or Skins," errors appear in the printed specification requiring correction, as follows: In line 58, page 2, the compound word "bell-roll" should read *bed-roll*, and page 9, the lines 17 and 18 should be transposed; and that the said Letters Patent should be read with these corrections therein that the same may conform to the record of the case in the Patent Office.

Signed and sealed this 29th day of December, A. D., 1908.

[SEAL.]

C. C. BILLINGS,
*Acting Commissioner of Patents.* ing said carrier to move the said roll into working relations with the other roll, a manual controlling device for such means, and driving devices for the bed-roll including a slack driving-band and means to tighten the said driving-band upon its pulleys when the rolls are in the said working relations.

37. In an apparatus for treating hides or skins, the combination with an operating roll, and a bed-roll, of devices for producing relative bodily approach of the said rolls and locking them in close working relations to enable the operating roll to act upon a hide or skin when supported by the bed-roll, power driving-connections for the devices for causing such approach, manually-operable means for shipping the said connections into driving relations with the said devices to actuate the latter, and driving devices acting to drive the bed-roll when the two rolls occupy working relations with respect to each other and to discontinue the driving thereof when the said relations are terminated.

38. In an apparatus for treating hides or skins, the combination with an operating roll, a roll serving as a support for the hide or skin while being acted upon by the operating roll, devices to close the said rolls together upon a hide or skin introduced between them, power-connections for the said devices, manually-controlled means for rendering said power-connections operative to actuate the said devices, and locking devices operating to retain the said rolls in closed relation.

39. In an apparatus for treating hides or skins, the combination with an operating roll, a roll serving as a support for the hide or skin while being acted upon by the operating roll, devices to close the said rolls together upon a hide or skin introduced between them, power-connections for the said devices, a manually-controlled clutch for rendering said power-connections operative to actuate the said devices, and means to terminate the closing action when the rolls come together.

40. In an apparatus for treating hides or skins, the combination with an operating roll, a roll serving as a support for the hide or skin while being acted upon by the operating roll, devices to close the said rolls together upon a hide or skin introduced between them, power-connections for the said devices, manually-controlled means for rendering said power-connections operative to actuate the said devices, and means acting automatically to unship the said power-connections on completion of the closing movement.

In testimony whereof I affix my signature in presence of two witnesses.

DANIEL P. O'BRIEN.

Witnesses:
CHAS. F. RANDALL,
EDITH J. ANDERSON.

---

Corrections in Letters Patent No. 904,079.

It is hereby certified that in Letters Patent No. 904,079, granted November 17, 1908, upon the application of Daniel P. O'Brien, of Woburn, Massachusetts, for an improvement in "Machines for Treating Hides or Skins," errors appear in the printed specification requiring correction, as follows: In line 58, page 2, the compound word "bell-roll" should read *bed-roll*, and page 9, the lines 17 and 18 should be transposed; and that the said Letters Patent should be read with these corrections therein that the same may conform to the record of the case in the Patent Office.

Signed and sealed this 29th day of December, A. D., 1908.

[SEAL.]

C. C. BILLINGS,
*Acting Commissioner of Patents.*

It is hereby certified that in Letters Patent No. 904,079, granted November 17, 1908, upon the application of Daniel P. O'Brien, of Woburn, Massachusetts, for an improvement in "Machines for Treating Hides or Skins," errors appear in the printed specification requiring correction, as follows: In line 58, page 2, the compound word "bell-roll" should read *bed-roll*, and page 9, the lines 17 and 18 should be transposed; and that the said Letters Patent should be read with these corrections therein that the same may conform to the record of the case in the Patent Office.

Signed and sealed this 29th day of December, A. D., 1908.

[SEAL.]

C. C. BILLINGS,
*Acting Commissioner of Patents.*